(12) United States Patent
Naitoh et al.

(10) Patent No.: US 7,239,797 B2
(45) Date of Patent: Jul. 3, 2007

(54) DATA STORAGE AND REPRODUCTION APPARATUS STORING AND REPRODUCING MULTIMEDIA DATA

(75) Inventors: Tadahiro Naitoh, Daito (JP); Makoto Takemoto, Daito (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 322 days.

(21) Appl. No.: 10/735,935

(22) Filed: Dec. 15, 2003

(65) Prior Publication Data

US 2004/0158767 A1 Aug. 12, 2004

(30) Foreign Application Priority Data

Dec. 24, 2002 (JP) ............................ 2002-372101

(51) Int. Cl.
*H04N 5/94* (2006.01)
*G06F 12/00* (2006.01)
*G06F 17/30* (2006.01)

(52) U.S. Cl. .................... 386/83; 386/91; 386/124; 386/600; 386/502; 711/161; 711/162; 707/202; 707/203

(58) Field of Classification Search ................ 386/113
See application file for complete search history.

(56) References Cited

U.S. PATENT DOCUMENTS

| 5,587,789 A * | 12/1996 | Lee et al. ................ 386/68 |
| 6,393,578 B1 * | 5/2002 | Swidler et al. ............ 713/600 |
| 6,684,294 B1 * | 1/2004 | Huffman ................ 711/112 |
| 2002/0039390 A1 * | 4/2002 | Koike ................ 375/316 |
| 2002/0106197 A1 * | 8/2002 | Boyle ................ 386/111 |
| 2003/0095791 A1 * | 5/2003 | Barton et al. ............ 386/83 |
| 2004/0002969 A1 * | 1/2004 | Perng et al. ............ 707/3 |

FOREIGN PATENT DOCUMENTS

| JP | 64-10465 | 1/1989 |
| JP | 5-236414 | 9/1993 |
| JP | 5-314726 | 11/1993 |
| JP | 7-249261 | 9/1995 |
| JP | 9-198848 | 7/1997 |
| JP | 10-97766 | 4/1998 |
| JP | 2001-312875 | 11/2001 |
| JP | 2002-032975 | 1/2002 |

(Continued)

OTHER PUBLICATIONS

Patent Abstracts of Japan, Publication No. 05-236414 dated Sep. 10, 1993, 1 pg.
Patent Abstracts of Japan, Publication No. 2002-152636 dated May 24, 2002, 1 pg.

(Continued)

*Primary Examiner*—B. James Peikari
(74) *Attorney, Agent, or Firm*—Osha Liang LLP

(57) ABSTRACT

An HDD is divided into a segment area storing multimedia data, an information file area storing an information file of a file, and a system information area storing a system information file. Storage of the system information file in the system information area and storage of the information file in the information file area are performed every prescribed time (X seconds), instead of a time point when recording and/or reproduction is stopped. If an apparatus suddenly stops, a location where damage is likely in the HDD can be detected by referring to the information file area and the system information area.

4 Claims, 4 Drawing Sheets

FOREIGN PATENT DOCUMENTS

| | | |
|---|---|---|
| JP | 2002-84498 | 3/2002 |
| JP | 2002-152636 | 5/2002 |
| JP | 2002-330376 | 11/2002 |

OTHER PUBLICATIONS

Patent Abstracts of Japan, Publication No. 2002-084498 dated Mar. 22, 2002, 1 pg.

Patent Abstracts of Japan, Publication No. 2002-032975 dated Jan. 31, 2002, 1 pg.

Patent Abstracts of Japan, Publication No.: 07-249261, Publication Date: Sep. 26, 1995, 1 page.

Patent Abstracts of Japan, Publication No.: 05-314726, Publication Date: Nov. 26, 1993, 1 page.

Patent Abstracts of Japan, Publication No.: 09-198848, Publication Date: Jul. 31, 1997, 1 page.

Patent Abstracts of Japan, Publication No.: 2001-312875, Publication Date: Nov. 09, 2001, 1 page.

Patent Abstracts of Japan, Publication No.: 64-010465, Publication Date: Jan. 13, 1989, 1 page.

Patent Abstracts of Japan, Publication No.: 10-097766, Publication Date: Apr. 14, 1998, 1 page.

Patent Abstracts of Japan, Publication No.: 2002-330376, Publication Date: Nov. 15, 2002, 1 page.

Japanese Office Action issued for Japanese Application No. 2002-372101, mailed on Feb. 21, 2006, and English translation thereof, 5 pages.

Japanese Final Decision for Rejection issued for Japanese Application 2002-372101, mailed on May 23, 2006, and English translation thereof, 4 pages.

\* cited by examiner

FIG.3

| SYSTEM INFORMATION FILE | RECORD FILE NUMBER |
| --- | --- |
| | REPRODUCTION FILE NUMBER |
| INFORMATION FILE OF FILE | FILE NAME |
| | FILE SIZE |
| | RECORDING DURATION |
| | IMAGE QUALITY |
| | RECORDING (REPRODUCTION) POINT |
| | USED SEGMENT |

DATA STORAGE AND REPRODUCTION APPARATUS STORING AND REPRODUCING MULTIMEDIA DATA

BACKGROUND OF THE INVENTION

1. Field of the Invention

The present invention relates to a data storage and reproduction apparatus, and more particularly to a data storage and reproduction apparatus capable of efficiently locating a defective segment.

2. Description of the Background Art

A variety of technologies for a data storage operation in a data storage and reproduction apparatus have conventionally been disclosed.

For example, Japanese Patent Laying-Open No. 5-236414 discloses a technology for avoiding loss of an already-recorded video signal by rewinding a magnetic tape when recording that was once interrupted automatically resumes in a recording and reproduction apparatus.

In addition, Japanese Patent Laying-Open No. 2002-152636 discloses a technology in which, in a case where many programs are successively recorded in a recording and reproduction apparatus, a discontinuity in recorded information produced when recording is temporarily stopped and then resumed is automatically registered as a boundary between chapters in information for administering the chapter.

Japanese Patent Laying-Open No. 2002-84498 discloses a technology in which, if recording is abnormally stopped during operation in a digital video recording apparatus, reproduction control information corresponding to video data that has been recorded until abnormal stop is recorded in a recording medium.

Japanese Patent Laying-Open No. 2002-32975 discloses a technology allowing reading of data that was recorded in a recording medium even if an apparatus may stop due to power failure or the like, by regularly recording in the recording medium or in a non-volatile memory, administrative information of data to be recorded in the recording medium in a data recording apparatus.

As described above, it is important to allow reading of the data that was recorded in the recording medium even if the apparatus stops due to power failure or the like. If the apparatus stops due to power failure or the like, the recording medium itself may be damaged. Accordingly, improvement in a data storage and reproduction apparatus also addressing such a problem has been desired.

SUMMARY OF THE INVENTION

The present invention was made in view of the aforementioned problems. An object of the present invention is to provide a data storage and reproduction apparatus allowing reading of data that was recorded in a recording medium even if an apparatus may stop due to power failure or the like, and capable of efficiently locating damage in the recording medium.

A data storage and reproduction apparatus according to one aspect of the present invention is characterized by including a storage portion constituted of a non-volatile memory, and a reproduction portion for reproducing multimedia data stored in the storage portion. The storage portion includes a first area storing multimedia data, a second area different from the first area, and a third area. The data storage and reproduction apparatus is characterized by further including a control portion causing the multimedia data to be recorded in the first area in the storage portion. The control portion causes the latest of storage position information which is information on a storage position in the first area, of the multimedia data stored in the first area, and the latest of reproduction position information which is information on a reproduction position of the multimedia data stored in the first area, to be stored in the second area with a flag every prescribed time, and causes information corresponding to the latest storage position information and the latest reproduction position information in the second area to be stored in the third area.

A data storage and reproduction apparatus according to another aspect of the present invention is characterized by including a storage portion constituted of a non-volatile memory, and a reproduction portion for reproducing multimedia data stored in the storage portion. The storage portion includes a first area storing multimedia data, a second area different from the first area, and a third area. The data storage and reproduction apparatus is characterized by further including a control portion causing the multimedia data to be recorded in the first area in the storage portion. The control portion causes storage position information which is information on a storage position in the first area, of the multimedia data stored in the first area, and/or reproduction position information which is information on a reproduction position of the multimedia data stored in the first area, to be stored in the second area every prescribed time, and causes information corresponding to the latest storage position information and/or the latest reproduction position information in the second area to be stored in the third area.

According to the present invention, in the data storage and reproduction apparatus, the storage portion includes the first to third areas. The storage position information which is the information on a storage position of the multimedia data stored in the first area of the storage portion and the reproduction position information which is the information on a reproduction position is regularly stored in the second area of the storage portion. The information corresponding to the latest storage position information and the latest reproduction position information is stored in the third area of the storage portion. Since the storage position information and the reproduction position information is regularly stored, reading of the data recorded in the recording medium can be allowed even if the apparatus stops due to power failure or the like. In addition, as the information corresponding to the latest storage position information and the latest reproduction position information, which is the information on a position of damage in the recording medium when the apparatus stops due to power failure or the like has been stored, damage in the recording medium can efficiently be located.

Further according to the present invention, the latest storage position information or the latest reproduction position information is stored with a flag. Therefore, even if storage of such information in the third area is unsuccessful, the latest storage position information or the latest reproduction position information can readily be detected.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 schematically shows information contained in a system information file stored in a system information area and an information file of a file stored in an information file area in FIG. 2.

DESCRIPTION OF THE PREFERRED EMBODIMENTS

Figure 1:
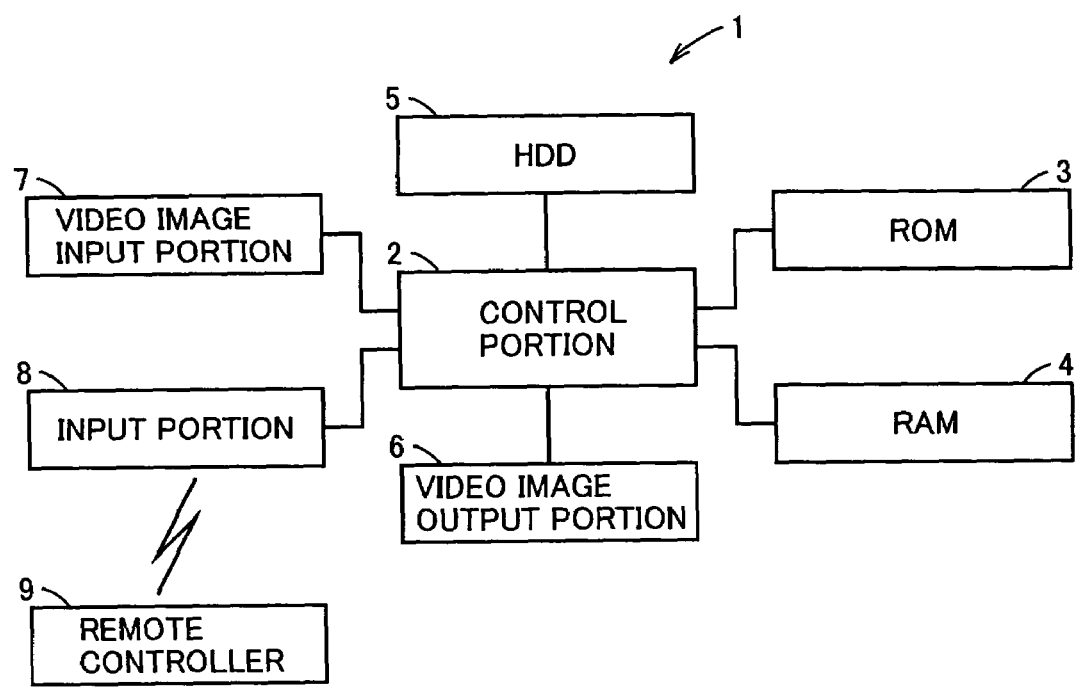
FIG. 1 is a control block diagram of a personal video recorder, which is one embodiment of a data storage and reproduction apparatus according to the present invention.

In the following, a personal video recorder (hereinafter, abbreviated as "PVR") which is one embodiment of the data storage and reproduction apparatus according to the present invention will be described with reference to the figures. It is noted that the same reference characters refer to the same or corresponding components in the description below unless otherwise specified, and their designations and functions are also the same. Therefore, detailed description thereof will not be repeated.

A PVR 1 includes a CPU 2 performing overall control of an operation of PVR 1.

PVR 1 includes an ROM (Read Only Memory) 3, an RAM (Random Access Memory) 4, an HDD 5, a video image output portion 6, a video image input portion 7, an input portion 8, and a remote controller 9.

ROM 3 records a program or the like to be executed by CPU 2, as in general information processing equipment. RAM 4 attains a function as a work area of CPU 2. HDD 5 is provided for recording multimedia data including video image data and information on a storage position of the multimedia data. Video image input portion 7 is provided for reception of a variety of data such as a video image obtained after conversion of signals received by an external antenna, or a variety of data sent from an external apparatus. Video image input portion 7 is also used for input of the received data to CPU 2.

Input portion 8 is provided for input of information to PVR 1 by a user, and constituted of a single or a plurality of key operation portion(s), for example. Remote controller 9 serves to transmit information to be input to PVR 1 from a place remote from PVR 1, and it transmits the information toward a reception portion (not shown) provided in input portion 8. In input portion 8, the information received from remote controller 9 is processed in the same manner as the information input from the key operation portion described above.

Video image output portion 6 is provided for output of data to an external display device, under control of CPU 2. Though PVR 1 without a display device has been described in the present embodiment, PVR 1 may be configured integrally with the display device. In other words, PVR 1 may be configured to include the display device.

Figure 2:
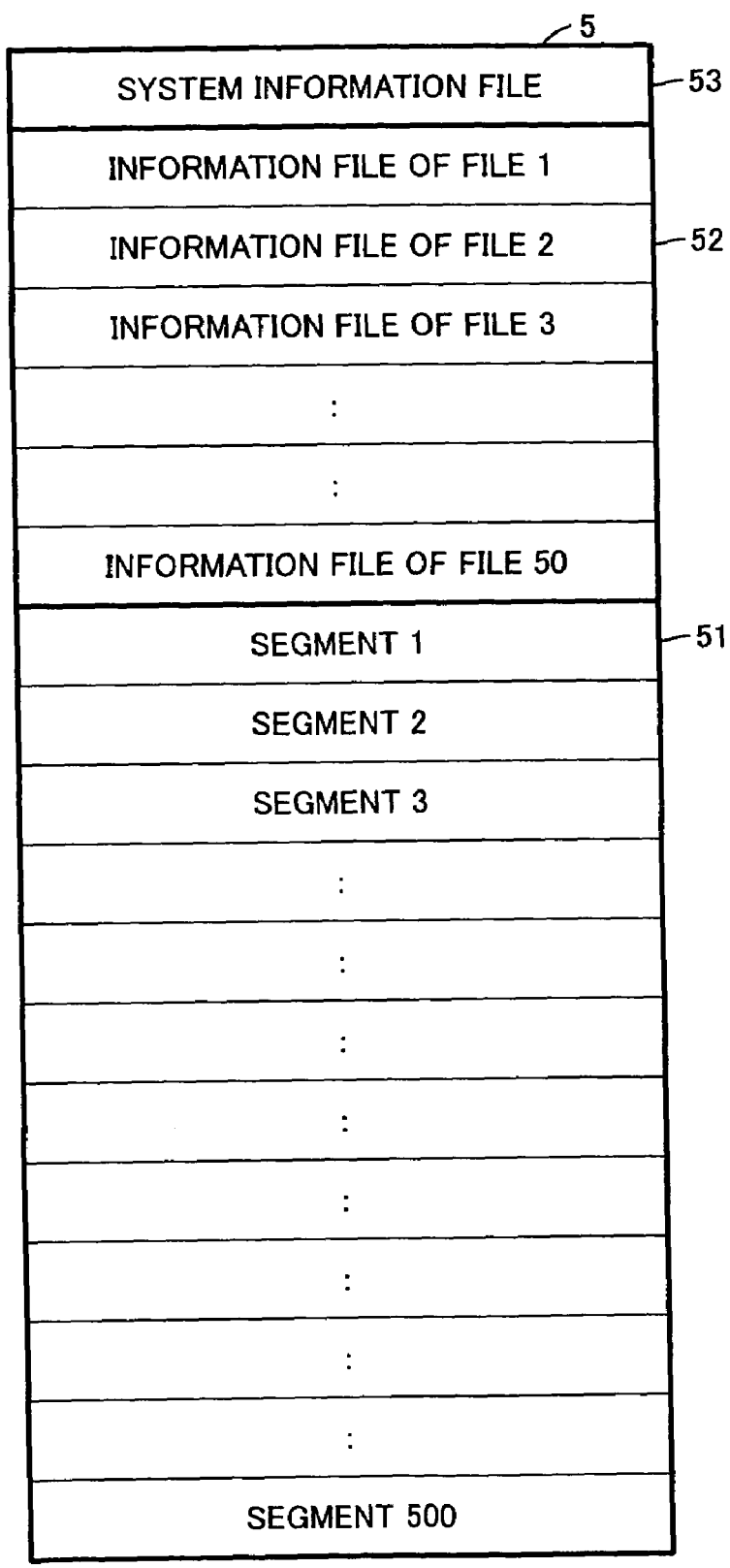
FIG. 2 schematically shows storage contents in an HDD (Hard Disk Drive).

Referring to FIG. 2, HDD 5 is divided into a segment area (first area) 51 storing multimedia data, an information file area (second area) 52 storing an information file of a file, and a system information area (third area) 53 storing a system information file.

Segment area 51 is further divided into 500 segments (segments 1 to 500).

Information file area 52 is divided into 50 blocks so as to store information files of file 1 to file 50. Information file area 52 stores information files every prescribed time sequentially from the information file of file 1. When information files are stored in all 50 areas, the latest information file overwrites the existing information file sequentially from the oldest one. Namely, PVR 1 can recognize up to 50 files. Here, the term "file" refers to a set of multimedia data recorded in one recording operation.

As shown in a lower column of a table in FIG. 3, each information file of the files from file 1 to file 50 includes file name, file size, recording duration, image quality, recording point, and used segment. More specifically, each information file of the files includes information at a certain time point on "how long (recording duration)" a record target has been recorded and recording started "from which point (recording point)" "in which segment (used segment)" within segment area 51. Here, the term "file name" refers to a file name corresponding to a file being recorded in that segment, while the term "file size" refers to a size of that file. The file size is varied depending on the recording duration and the image quality. The image quality can be determined in PVR 1 as appropriate, and may be modified in accordance with the information provided to input portion 8.

An information file of a file created when a reproduction operation is in progress in PVR 1 includes a point being reproduced at that time point (reproduction point) instead of the recording point described above.

In addition, in PVR 1, an information file of a file is created every prescribed time during recording. On the other hand, when reproduction and recording are being performed simultaneously, both an information file of a file with regard to recording and an information file of a file with regard to reproduction are created.

As shown in an upper column of the table in FIG. 3, the system information file includes a record file number for specifying the information file with regard to recording and a reproduction file number for specifying the information file with regard to reproduction at that time point in information file area 52.

Figure 4:
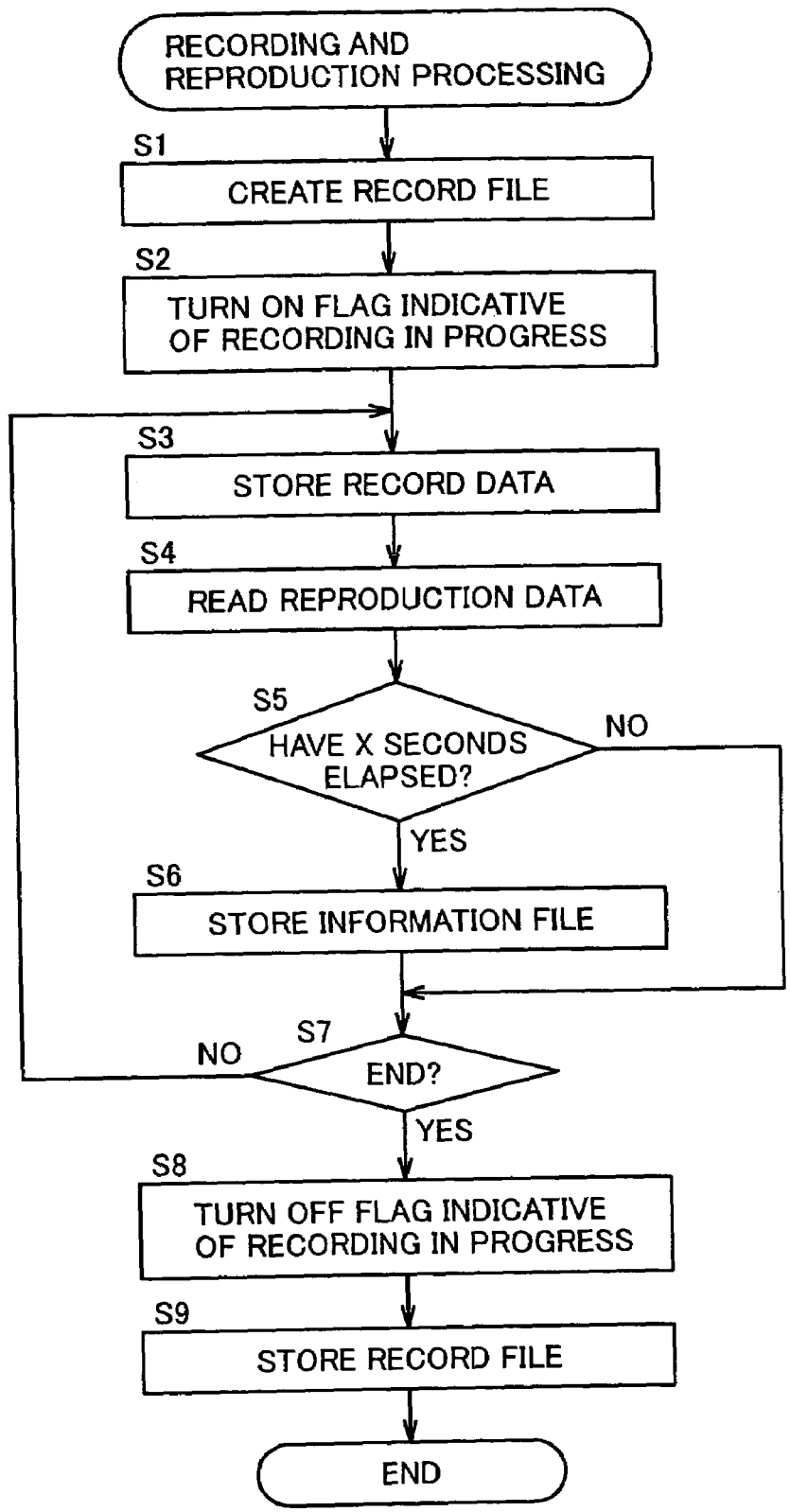
FIG. 4 is a flowchart illustrating a recording and reproduction processing executed by a CPU (Central Processing Unit) in FIG. 1.

The recording and reproduction processing shown in FIG. 4 is a processing executed by CPU 2 when the multimedia data is stored (recorded) in HDD 5 and the multimedia data stored in HDD 5 is reproduced in PVR 1.

When the recording and reproduction processing is started, initially at step S1 (hereinafter, the term "step" will not be repeated), CPU 2 creates multimedia data (record file) to be stored later in segment area 51, and causes RAM 4 to temporarily store the data.

Then, at S2, CPU 2 turns ON a flag indicative of recording in progress.

CPU 2 then stores the record data that was once stored in RAM 4 in segment area 51.

Thereafter, at S4, CPU 2 reads data to be reproduced from HDD 5, and outputs the data to the external display device or the like via video image output portion 6. The data is thus reproduced.

At S5, CPU 2 determines whether or not X seconds (predetermined value) have elapsed since the previous processing at S6 described later. If X seconds have elapsed, at S6, CPU 2 causes the information file created at that time point to be stored in information file area 52 and causes the system information file created at that time point to be stored in system information area 53. Then, the processing proceeds to S7. If X seconds have not elapsed, the processing directly proceeds to S7. At S6, if recording and reproduction are both performed, one information file for each is created and stored.

At S7, CPU 2 determines whether or not an operation instructing termination of the recording and reproduction processing has been performed at input portion 8. If it is determined that such an operation has been performed, the processing proceeds to S8. On the other hand, if it is determined that such an operation has not been performed, the processing proceeds to S3.

At S8, CPU 2 turns OFF the flag indicative of recording in progress.

Then, at S9, CPU 2 stores the record file, and the processing ends.

Though the processing for simultaneous recording and reproduction in PVR 1 has been described in the present embodiment above, the same processing is performed also when either recording or reproduction is performed. In other words, when solely recording is performed, the processing associated with reproduction among processings described with reference to FIG. 4 is not performed. Meanwhile, when solely reproduction is performed, the processing associated with recording among processings described with reference to FIG. 4 is not performed.

According to the embodiment described above, storage of the system information file in system information area 53 and storage of the information file in information file area 52 are performed every prescribed time (X seconds), instead of a time point when recording and/or reproduction is stopped. Therefore, if PVR 1 suddenly stops and recording and/or reproduction stops regardless of the processing at S7, an amount of multimedia data that has been stored in RAM 4 but has not yet been stored in HDD 5 or an amount of multimedia data that has been stored in HDD 5 but cannot be reproduced due to unavailability of information corresponding to information file area 52 and system information file 53 can be suppressed to minimum.

In addition, according to the present embodiment, if PVR 1 suddenly stops regardless of the processing at S7, damage is likely at a position where reproduction or recording was being performed in HDD 5. In the present embodiment, information is stored in information file area 52 and system information area 53 every prescribed time. Accordingly, even if PVR 1 suddenly stops as described above, a location likely to have been damaged in HDD 5 can readily be detected by referring to the information in each of these areas. Therefore, by checking such a location and its vicinity, error check for a location likely to have been damaged in HDD 5 can efficiently be conducted.

When the information file is stored in information file area 52, the latest information file is stored preferably with a flag. That is, it is preferable to turn on a flag for the latest information file with regard to recording if a recording operation is in progress, and it is preferable to turn on a flag for the latest information file with regard to reproduction if a reproduction operation is in progress. In this manner, even if storage of the system information file in system information area 53 is incomplete, an effect as described above can be obtained. In this case, this effect will be obtained if the flag is turned on for at least one of the latest information file with regard to recording and the latest information file with regard to reproduction.

In addition, if PVR 1 is configured such that the flag can be turned on for each program stored in segment area 51, PVR 1 can obtain information on "up to which point recording has been completed" or "up to which point reproduction has been finished" for each program. In this manner, for example, the processing such as starting reproduction from a point where the previous reproduction was finished can be allowed for each program in PVR 1. Whether or not the program to be reproduced is the same as the previously-reproduced program in the data stored in segment area 51 is recognized by the file name, for example.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A personal video recorder apparatus, comprising:
   a storage portion constituted of a non-volatile memory, said storage portion including a first area storing multimedia data, a second area different from said first area, and a third area, different from said first and second areas;
   a reproduction portion for reproducing the multimedia data stored in said storage portion; and
   a control portion causing the multimedia data to be recorded in said first area in said storage portion; wherein
   said control portion
   causes latest of storage position information which is information on a storage position in said first area, of the multimedia data stored in said first area, and latest of reproduction position information which is information on a reproduction position of the multimedia data stored in said first area, to be stored in said second area with a flag every prescribed time, and
   causes information corresponding to the latest of said storage position information and the latest of said reproduction position information in said second area to be stored in said third area.

2. A personal video recorder apparatus, comprising:
   a storage portion constituted of a non-volatile memory, said storage portion including a first area storing multimedia data, a second area different from said first area, and a third area, different from said first and second areas;
   a reproduction portion for reproducing the multimedia data stored in said storage portion; and
   a control portion causing the multimedia data to be recorded in said first area in said storage portion; wherein
   said control portion
   causes storage position information which is information on a storage position in said first area, of the multimedia data stored in said first area, and/or reproduction position information which is information on a reproduction position of the multimedia data stored in said first area, to be stored in said second area every prescribed time, and
   causes information corresponding to latest of said storage position information and/or latest of said reproduction position information in said second area to be stored in said third area.

3. The personal video recorder apparatus according to claim 2, wherein
   said control portion causes the latest of said storage position information to be stored in said second area with a flag.

4. The personal video recorder apparatus according to claim 2, wherein
   said control portion causes the latest of said reproduction position information to be stored in said second area with a flag.

* * * * *